United States Patent
Chakra et al.

(10) Patent No.: US 10,567,269 B2
(45) Date of Patent: Feb. 18, 2020

(54) DYNAMICALLY REDIRECTING AFFILIATED DATA TO AN EDGE COMPUTING DEVICE

(71) Applicant: INTERNATIONAL BUSINESS MACHINES CORPORATION, Armonk, NY (US)

(72) Inventors: Al Chakra, Apex, NC (US); Yuk L. Chan, Rochester, NY (US); Jonathan Dunne, Dungarvan (IE); Liam S. Harpur, Skerries (IE)

(73) Assignee: International Business Machines Corporation, Armonk, NY (US)

( * ) Notice: Subject to any disclaimer, the term of this patent is extended or adjusted under 35 U.S.C. 154(b) by 43 days.

(21) Appl. No.: 15/920,632

(22) Filed: Mar. 14, 2018

(65) Prior Publication Data
US 2019/0288934 A1 Sep. 19, 2019

(51) Int. Cl.
*H04L 12/721* (2013.01)
*H04L 12/751* (2013.01)
*H04L 12/851* (2013.01)

(52) U.S. Cl.
CPC .............. *H04L 45/12* (2013.01); *H04L 45/02* (2013.01); *H04L 45/38* (2013.01); *H04L 45/70* (2013.01); *H04L 47/2425* (2013.01)

(58) Field of Classification Search
None
See application file for complete search history.

(56) References Cited

U.S. PATENT DOCUMENTS

2013/0080623 A1* 3/2013 Thireault .............. G06F 9/5027
709/224
2015/0195146 A1 7/2015 Di Pietro et al.
(Continued)

OTHER PUBLICATIONS

Jacquenet et al., "A Software-Defined Approach to IoT Networking", Nov. 16, 2015, pp. 61-66, France Telecom Orange, vol. 14, No. 1, ZTE Communications, http://res.www.zte.com.cn/mediares/magazine/publication/com_en/article/201601/448976/P020160311298781218045.pdf, France.
(Continued)

*Primary Examiner* — Alpus Hsu
*Assistant Examiner* — Camquyen Thai
(74) *Attorney, Agent, or Firm* — Anthony M. Pallone

(57) ABSTRACT

An embodiment of the invention may include a method, computer program product and system for redirecting data within a network. The embodiment may include receiving data for aggregation. The received data originates from one or more computing devices and flows through one or more edge devices. The received data comprises associated metadata. The embodiment may include identifying a topology for the received data based on the associated metadata. The embodiment may include determining whether the received data can be aggregated at an earlier edge device. The embodiment may include determining an aggregation location for subsequent data. The subsequent data is affiliated with the received data. The embodiment may include determining a network route for utilization by the subsequent data. The embodiment may include propagating the determined aggregation location and network route. The embodiment may include transmitting the received data to the determined aggregation location.

17 Claims, 5 Drawing Sheets

(56) References Cited

U.S. PATENT DOCUMENTS

2018/0234489 A1* 8/2018 Hammons ............ H04L 67/1023
2019/0116128 A1* 4/2019 Guo ...................... H04L 47/762
2019/0132197 A1* 5/2019 Saxena ............... H04L 41/0803

OTHER PUBLICATIONS

Betzler et al., "On the Benefits of Wireless SDN in Networks of Constrained Edge Devices", Jun. 27-30, 2016, 5 Pages, 2016 European Conference on Networks and Communications (EuCNC), Section IV, IEEE Xplore, http://www.5g-xhaul-project.eu/download/eucnc_constrained_SDN_final.pdf, Athens, Greece.

Hu, et al., "Location-Based Data Aggregation in 6LoWPAN", Mar. 20, 2015, 10 Pages, International Journal of Distributed Sensor Networks, vol. 2015, Article 912926, Hindawi Publishing Corporation, http://dx.doi.org/10.1155/2015/912926.

Martins, Abstract of "On a Multi-Criteria Shortest Path Problem", May 1984, pp. 236-245, European Journal of Operational Research, vol. 16, Issue 2, pp. 236-245, Elsevier, https://doi.org/10.1016/0377-2217(84) 90077-8.

Fasolo et al., "In-Network Aggregation Techniques for Wireless Sensor Networks: A Survey", IEEE Wireless Communications, May 15, 2017, 26 Pages, vol. 14, Issue: 2, Apr. 2007, DoCoMo Euro-Labs, https://pdfs.semanticscholar.org/f0ef/8d0946614c0-50352593deae0041704a0b64b.pdf, Munich, Germany.

Mell et al., "The NIST Definition of Cloud Computing", Recommendations of the National Institute of Standards and Technology, NIST Special Publication 800-145, Sep. 2011, 7 pages.

* cited by examiner

DYNAMICALLY REDIRECTING AFFILIATED DATA TO AN EDGE COMPUTING DEVICE

BACKGROUND

The present invention relates, generally, to the field of computer networks, and more specifically, to optimizing cloud computing through the use of edge computing.

Edge computing is a method of optimizing cloud computing systems by performing data processing at the edge of the network, near the originating source of the data. This reduces the communications bandwidth needed between end user computing devices and a central cloud data center (i.e. one or more cloud servers) by performing analytics and knowledge generation at or near the source of data. Through the use of edge computing, time sensitive data may be sent to an intermediary device, located in close geographical proximity to the originating source of data, whereas data that is less time sensitive may be sent to the cloud. Edge computing requires leveraging resources that may not be continuously connected to a network such as laptops, smartphones, tablets, and sensors.

BRIEF SUMMARY

An embodiment of the invention may include a method, computer program product and system for redirecting data within a network. The embodiment may include receiving data for aggregation. The received data originates from one or more computing devices and flows through one or more edge devices. The received data comprises associated metadata. The embodiment may include identifying a topology for the received data based on the associated metadata. Based on the identified topology, the embodiment may include determining whether the received data can be aggregated at an earlier edge device. In response to determining that the received data can be aggregated at an earlier edge device, the embodiment may include determining an aggregation location for subsequent data. The subsequent data originates from the one or more computing devices. The subsequent data is affiliated with the received data. In response to determining that the received data can be aggregated at an earlier edge device, the embodiment may include determining a network route for utilization by the subsequent data. The determined network route begins at the one or more computing devices and terminates at the aggregation location. The embodiment may include propagating the determined aggregation location and the determined network route throughout the network. The embodiment may include transmitting the received data to the determined aggregation location.

DETAILED DESCRIPTION

Figure 1:
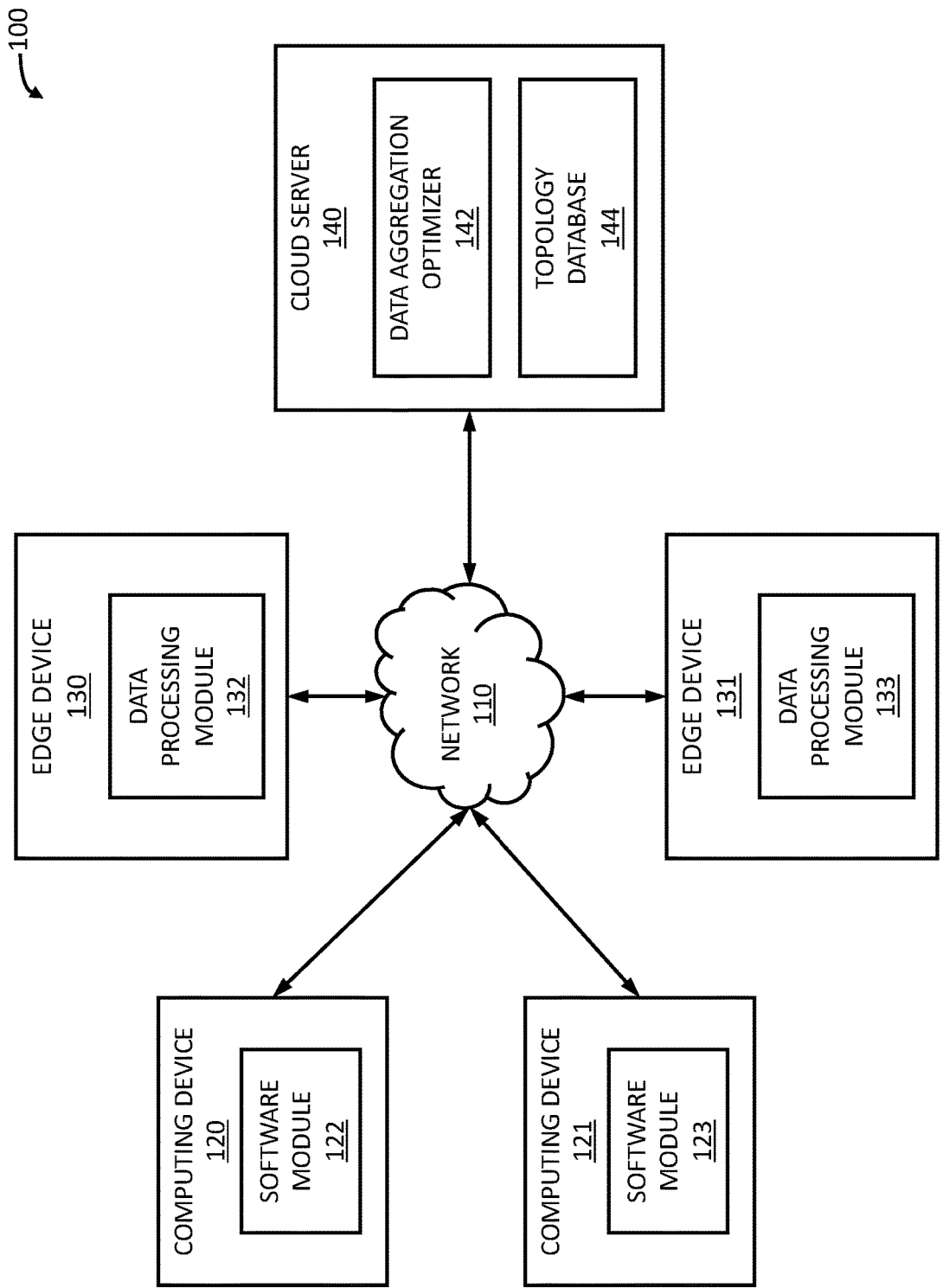
FIG. 1 is a block diagram illustrating a dynamic edge routing (DER) system, in accordance with an embodiment of the present invention.

Data processing within cloud computing typically happens on some data center in the cloud. Processing services are somewhat centralized within the data center. Edge computing, however, pertains to data processing that happens closer to the data source instead of a distant data center. When processing services execute close to the data source, the devices performing the processing may be known as edge devices (e.g. a smart router that sits between a data source and a data center). Edge computing moves applications, data, and computing services away from centralized cloud data centers to the logical edges of a network. In some networks, it is more efficient to process data (e.g. aggregate data) near its source and send only the data that has value over the network to the cloud data center (e.g. the aggregated data). Doing so may benefit the network through reduction in response time and conservation of network resources as transmitting massive amounts of un-processed data over the network places considerable load on available network resources.

The move towards edge computing has been driven, in part, by factors such as advances in mobile computing, decreasing cost of computer components, and the increasing number of networked devices in the internet of things (IoT). As the IoT increases exponentially, transmission of tremendous amounts of collected data through the network infrastructure to a cloud data center for processing (e.g. aggregation) may become too intensive and unrealistic. This is especially applicable in situations where near real-time processing of data is required. Edge computing assesses the data locally so some of it is processed locally, thereby reducing the amount of data traffic to the cloud data center. For example, one hundred temperature sensors may transmit temperature readings to the same router (i.e. the edge computing device). This router may possess logic to determine the average, mean, and standard deviation of the received temperature readings. Rather than transmitting large amounts of un-processed temperature data from the 100 sensors over a network to the cloud, the router may send only the calculated average, mean, and standard deviation values to the cloud.

While the network in the preceding example benefits from reduced data traffic and latency, it is important to note that the data reduction, aggregation, and analytics are only within the scope of the data received at the edge computing device. Furthermore, the data sources (i.e. the temperature sensors) are statically connected to the edge computing device (i.e. the router). Even in a complex environment with multiple edge computing devices, the data processing at a particular edge computing device is only within the scope of the data received at that edge computing device. Moreover, the particular data source(s) from which each edge computing device will receive and process data is also statically configured. An inefficiency arises when there are multiple data sources (e.g. temperature sensors, wheel speed sensors, traction sensors, wind speed sensors) requiring interaction with each other or possessing some relationship. The edge computing devices performing the processing may not understand or be aware of the interactions or relationships of the data received from the multiple data sources. For instance, in an environment where there exists a temperature sensor located at the beginning of a street, another temperature sensor located at the middle of the street, and another temperature sensor located at the end of the street, it is possible that these three temperatures may traverse different routes (through different edge devices) to the cloud.

Since the cloud has eventual knowledge of all data sources and their relationships, embodiments of the present invention propose that the cloud influence the routing of data in terms of deciding which edge computing device the received data should flow into. This routing decision may also be based on the knowledge of what each edge computing device is capable of processing, and also the dependency and relationship of the received data. For example, where there are two types of data being collected and data of the same type should be aggregated together, it would be advantageous to route all data of the same type to the same edge computing device. As another example, where data type 1 should be aggregated before data type 2 is aggregated (i.e. data type 2 aggregation depends on data type 1 aggregation), it would be advantageous to route all data type 1 to the same initial edge computing device, and then route all data type 2 to a second edge computing device that intersects with the initial edge computing device so that the data can be aggregated according to the specified dependency.

Embodiments of the present invention may include a dynamic edge routing (DER) system 100, described below, which provides a method to determine data aggregation location(s) based on data relationship and interdependency. DER system 100 may receive, via one or more edge devices, data originating from one or more computing devices. Based on the identified topology, DER system 100 may then identify an enhanced topology for the received data and determine if a possible aggregation location for the received data exists among the one or more edge devices based. If an aggregation location exists, DER system 100 may determine a network route, to the aggregation location, for subsequent data affiliated with the received data and utilize known network routing techniques, such as software defined network (SDN) routing and TCP/IP based routing, to implement the route.

Embodiments of the present invention will now be described in detail with reference to the accompanying Figures.

FIG. 1 is a functional block diagram illustrating dynamic edge routing system 100, in accordance with an embodiment of the present invention. In an example embodiment, dynamic edge routing system 100 may include computing device 120, computing device 121, edge device 130, edge device 131, and cloud server 140, all interconnected via network 110.

DER system 100 may be operable to determine data aggregation location(s) based on one or more of the following: relationships within received data, data affinity, hierarchy of data processing, and data interdependency. In implementing determined aggregation location(s), DER system 100 may utilize known network routing techniques to facilitate dynamic aggregation of data from multiple data sources, such that the data from the multiple data sources may be aggregated at one or more edge computing devices. DER system 100 may also operate to utilize a service level agreement (SLA) to determine a percentage of data to be aggregated at one or more edge computing devices. Further, DER system 100 may also identify, through multivariate analysis, key data sources for aggregation and data sources which generate anomalous values.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support communications between computing device 120, edge device 130, and cloud server 140.

In an example embodiment, computing device 120 may include software module 122. Computing device 120 may be a laptop computer, a notebook, a tablet computer, a netbook computer, a personal computer (PC), a desktop computer, a personal digital assistant (PDA), a smart phone, a mobile phone, a sensor, an industrial machine, a virtual device, a thin client, or any other electronic device or computing system capable of generating, sending, and receiving data to and from other computing devices such as edge device 130, via network 110, and capable of supporting the functionality required of embodiments of the invention. In an example embodiment, computing device 120 may be a static device (e.g. a fixed temperature sensor) transmitting data (e.g. temperature readings) from a fixed location. In another embodiment, computing device 120 may be a mobile electronic device (e.g. a traction sensor located on a vehicle) or computing system capable of generating, sending, and receiving data to and from other computing devices such as edge device 130, via network 110, and capable of supporting the functionality required of embodiments of the invention. For example, an automobile driving on an icy road may transmit some notification to an edge device alerting other cars on the same road of its traction status. While computing device 120 is shown as a single device, in other embodiments, computing device 120 may be comprised of a cluster or plurality of computing devices, working together or working separately. Computing device 120 may be described generally with respect to FIG. 3 below. In an example embodiment, computing device 120 may collect and send, via software module 122, data to edge device 130.

In an example embodiment, software module 122 may be a program, or subroutine contained in a program, that may operate to collect data from computing device 120. Software module 122 may also operate to send and receive data to and from other computing devices such as edge device 130, via network 110. For example, software module 122 may support a communication link (e.g., wired, wireless, direct, via a LAN, via the network 110, etc.) between computing device 120 and edge device 130. In an example embodiment, software module 122 may transmit data collected from computing device 120 to cloud server 140 via edge device 130 and network 110. In addition to the data itself, the collected data may also include metadata which may describe attributes of the data such as type, relationship(s) to data from other computing devices, data affinity, processing hierarchy, and interdependency to data from other computing devices. Furthermore, in an example embodiment, software module 122 may also receive data from cloud server 140, via network 110 and edge device 130. The received data may include routing decision information.

In an example embodiment, computing device 121 may include software module 123. Computing device 121 may be a laptop computer, a notebook, a tablet computer, a netbook computer, a personal computer (PC), a desktop computer, a personal digital assistant (PDA), a smart phone, a mobile phone, a sensor, an industrial machine, a virtual device, a thin client, or any other electronic device or computing system capable of generating, sending, and receiving data to and from other computing devices such as edge device 131, via network 110, and capable of supporting the functionality required of embodiments of the invention. In an example embodiment, computing device 121 may be a static device (e.g. a fixed temperature sensor) transmitting data (e.g. temperature readings) from a fixed location. In another embodiment, computing device 121 may be a mobile electronic device (e.g. a traction sensor located on a vehicle) or computing system capable of generating, sending, and receiving data to and from other computing devices such as edge device 131, via network 110, and capable of supporting the functionality required of embodiments of the invention. For example, an automobile driving on an icy road may transmit some notification to an edge device alerting other cars on the same road of its traction status. While computing device 121 is shown as a single device, in other embodiments, computing device 121 may be comprised of a cluster or plurality of computing devices, working together or working separately. Computing device 121 may be described generally with respect to FIG. 3 below. In an example embodiment, computing device 121 may collect and send, via software module 123, data to edge device 131.

In an example embodiment, software module 123 may be a program, or subroutine contained in a program, that may operate to collect data from computing device 121. Software module 123 may also operate to send and receive data to and from other computing devices such as edge device 131, via network 110. For example, software module 123 may support a communication link (e.g., wired, wireless, direct, via a LAN, via the network 110, etc.) between computing device 121 and edge device 131. In an example embodiment, software module 123 may transmit data collected from computing device 121 to cloud server 140 via edge device 131 and network 110. In addition to the data itself, the collected data may also include metadata which may describe attributes of the data such as type, relationship(s) to data from other computing devices, data affinity, processing hierarchy, and interdependency to data from other computing devices. Furthermore, in an example embodiment, software module 123 may also receive data from cloud server 140, via network 110 and edge device 131. The received data may include routing decision information.

In an example embodiment, edge device 130 may include data processing module 132. Edge device 130 may be a desktop computer, a notebook, a laptop computer, a blade server, a networked computer appliance, a router, or any other networked electronic device or computing system located in close geographical proximity to computing devices 120 and 121, capable of receiving and sending data from and to other computing devices such as computing device 120 and cloud server 140, via network 110, and capable of supporting the functionality required of embodiments of the invention. In an example embodiment, edge device 130 may function to replicate services of cloud server 140 locally. In an example embodiment, edge device 130 may also function to facilitate the transfer of data between computing device 120 and cloud server 140. While edge device 130 is shown as a single device, in other embodiments, edge device 130 may be comprised of a cluster or plurality of edge devices, working together or working separately. Edge device 130 may be described generally with respect to FIG. 3 below.

In an example embodiment, data processing module 132 may be a fat client, a program, or subroutine contained in a program, that may operate to process (e.g. analyze, aggregate) data in edge device 130. Data processing module 132 may receive data from computing device 120 and cloud server 140. Data processing module 132 may also send data to other computing devices such as computing device 120 and cloud server 140, via network 110. For example, data processing module 132 may support a communication link (e.g., wired, wireless, direct, via a LAN, via the network 110, etc.) between computing device 120 and cloud server 140. In an example embodiment, data processing module 132 may transmit data collected from computing device 120 to cloud server 140 via edge device 130 and network 110. Furthermore, in an example embodiment, data processing module 132 may also receive data containing routing decisions from cloud server 140, via network 110.

In an example embodiment, edge device 131 may include data processing module 133. Edge device 131 may be a desktop computer, a notebook, a laptop computer, a blade server, a networked computer appliance, a router, or any other networked electronic device or computing system located in close geographical proximity to computing devices 120 and 121, capable of receiving and sending data from and to other computing devices such as computing device 121 and cloud server 140, via network 110, and capable of supporting the functionality required of embodiments of the invention. In an example embodiment, edge device 131 may function to replicate services of cloud server 140 locally. In an example embodiment, edge device 131 may also function to facilitate the transfer of data between computing device 121 and cloud server 140. While edge device 131 is shown as a single device, in other embodiments, edge device 131 may be comprised of a cluster or plurality of edge devices, working together or working separately. Edge device 131 may be described generally with respect to FIG. 3 below.

In an example embodiment, data processing module 133 may be a fat client, a program, or subroutine contained in a program, that may operate to process (e.g. analyze, aggregate) data in edge device 131. Data processing module 133 may receive data from computing device 121 and cloud server 140. Data processing module 133 may also send data to other computing devices such as computing device 121 and cloud server 140, via network 110. For example, data processing module 133 may support a communication link (e.g., wired, wireless, direct, via a LAN, via the network 110, etc.) between computing device 121 and cloud server 140. In an example embodiment, data processing module 133 may transmit data collected from computing device 121 to cloud server 140 via edge device 131 and network 110. Furthermore, in an example embodiment, data processing module 133 may also receive data containing routing decisions from cloud server 140, via network 110.

In an example embodiment, cloud server 140 may include data aggregation optimizer 142 and topology database 144. Cloud server 140 may be a desktop computer, a notebook, a laptop computer, a blade server, a networked computer appliance, a virtual device, or any other networked electronic device or computing system capable of receiving and sending data from and to other computing devices such as edge devices 130 and 131, via network 110, and capable of supporting the functionality required of embodiments of the invention. In an example embodiment, cloud server 140 may function to process data received from computing devices 120 and 121, via edge devices 130 and 131. While cloud server 140 is shown as a single device, in other embodiments, cloud server 140 may be comprised of a cluster or plurality of computing devices, working together or working separately. Cloud server 140 may be described generally with respect to FIG. 3 below.

In an example embodiment, topology database 144 represents a database management system that may be used to store data topologies (e.g. enhanced topologies) received from data aggregation optimizer 142 and data topologies (e.g. natural topologies) received from a network administrator or resulting from an initial network setup. In an example embodiment, topology database 144 may store an enhanced topology identified by data aggregation optimizer 142.

In an example embodiment, data aggregation optimizer 142 may be a program, or subroutine contained in a program, that may operate to determine data aggregation location(s) and network routes for data originating from computing devices 120 and 121. In an example embodiment, data aggregation optimizer 142 may analyze data originating from computing device 120, and received via edge device 130, to identify any existing attribute(s), relationship(s), affinities, hierarchies, and interdependencies within the data in order to determine potential data aggregation location(s) among edge devices (e.g. edge devices 130 and 131). Also, in an example embodiment, data aggregation optimizer 142 may analyze data originating from computing device 121, and received via edge device 131, to identify any existing attribute(s), relationship(s), affinities, hierarchies, and interdependencies within the data in order to determine potential data aggregation location(s) among edge devices. While data aggregation optimizer 142 is shown as being located within cloud server 140, in other embodiments, data aggregation optimizer 142 may be located within an edge device (e.g. edge devices 130 and 131). Additionally, in an example embodiment, data aggregation optimizer 142 may operate to transmit, via edge devices 130 and 131, determined data aggregation location(s) and network routing decisions to computing devices 120 and 121. Furthermore, in an example embodiment, data aggregation optimizer 142 may operate to access (e.g. store/retrieve) topologies (e.g. natural topologies, enhanced topologies) within topology database 144. In another embodiment, data aggregation optimizer 142 may determine alternate data aggregation locations among edge devices (e.g. edge devices 130 and 131) for one or more computing devices (e.g. computing devices 120 and 121) according to a service level agreement (SLA) governing DER system 100. The operations and functions of data aggregation optimizer 142 are described in further detail below with regard to FIG. 2.

Figure 2:
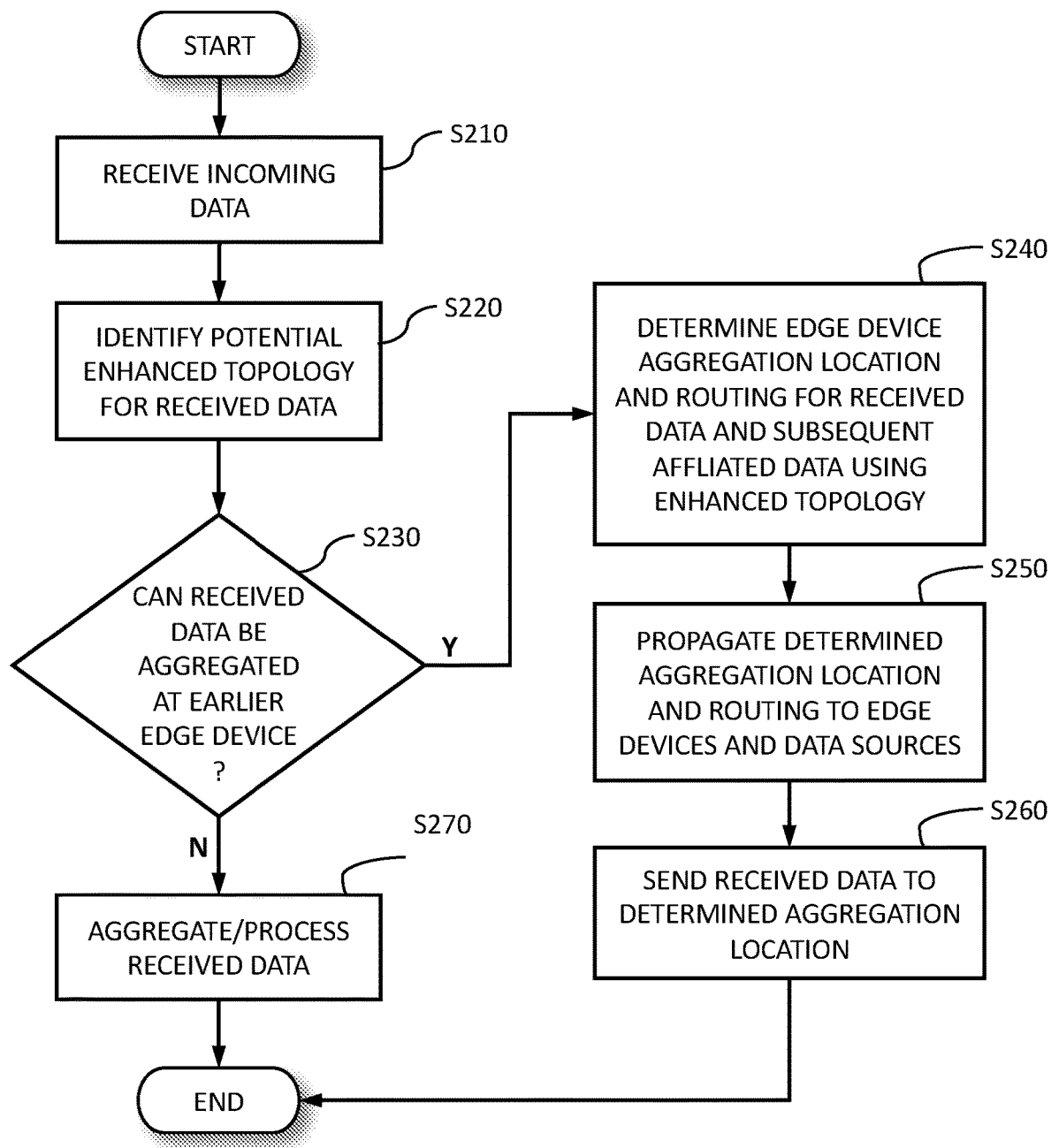
FIG. 2 is a flowchart illustrating the operations of the data aggregation optimizer of FIG. 1, in accordance with an embodiment of the invention.

FIG. 2 shows a flowchart illustrating the operations of data aggregation optimizer 142 in accordance with an example embodiment of the invention. Referring to step S210, data aggregation optimizer 142 may receive, via edge device 130 and edge device 131, data originating from computing device 120 and computing device 121. In an embodiment, the data may be raw/unprocessed data received according to a natural topology for the network stored in topology database 144. The natural topology may exist in lieu of an enhanced topology identified by data aggregation optimizer 142. The natural topology may also exist as a result of initial network setup or as a result of configuration by a network administrator. In another embodiment, the data may be aggregated/processed data received according to an enhanced topology previously identified by data aggregation optimizer 142 and stored in topology database 144. In addition to the data itself, the received data may include metadata which may describe attributes of the data such as data type, relationship(s) to data from other computing devices, data affinity (e.g. a shared property), data processing hierarchy, and interdependency to data from other computing devices. For example, data aggregation optimizer 142 may receive temperature readings originating from one or more computing devices located separately (e.g. computing devices 120 and 121). The metadata associated with the received temperature readings may include information describing the geographic proximity between the originating computing devices and the edge devices (e.g. edge device 130, edge device 131) used by the computing devices to relay the temperature readings. As another example, data aggregation optimizer 142 may receive data of different types (e.g. wheel speeds and friction coefficients) originating from one or more computing devices located separately (e.g. computing devices 120 and 121). The metadata associated with the received data may include information specifying the data type of each datum, an order of processing based on data type, the network route used for each data type, and the processing capabilities of edge devices along the utilized network route. In an example embodiment, data aggregation optimizer 142 receives, according to the natural network topology, unprocessed/un-aggregated temperature readings and associated metadata, originating from computing device 120 and computing device 121, from edge device 130 and edge device 131, respectively. In another embodiment, data aggregation optimizer 142 may receive aggregated data according to a previously identified enhanced topology. In an example embodiment, computing device 120 and computing device 121 may be located at separate fixed locations. In another embodiment, computing device 120 and computing device 121 may be ambulatory.

Referring to step S220, data aggregation optimizer 142 may identify an enhanced topology for the data based on the data and metadata received in step S210. The enhanced topology may be identified through analysis of the data originating from one or more computing devices (e.g. computing device 120 and computing device 121) to identify any existing attributes, relationships, affinities, hierarchies, and interdependencies within the data. For example, the identified enhanced topology may indicate that all data of first type, received form a first edge device, must be aggregated before data of a second type, received from a second edge device connected to same network. As another example, the identified enhanced topology may indicate that data of the same type, originating from multiple computing devices on the same network, is received from multiple edge devices. As yet another example, the identified enhanced topology may provide details concerning the data processing capabilities of edge devices used to propagate data along the network to data aggregation optimizer 142. In an example embodiment, data aggregation optimizer 142 identifies an enhanced topology for the data received in step S210 which indicates that data of the same type (i.e. temperature readings originating from computing devices 120 and 121) are received from separate edge devices (i.e. edge device 130 and 131) and that edge device 130 possesses the processing capability to aggregate the received temperature readings.

Referring to step S230, data aggregation optimizer 142 may determine whether aggregation of the data received in step S210 can occur at an earlier edge device. This determination may be based on knowledge of the enhanced topology identified in step S220. For example, if the identified enhanced topology reveals that data of the same type, originating from multiple computing devices (e.g. computing devices 120 and 121), is flowing through different edge devices and that a particular edge device possesses the processing capability to aggregate the data of the same type from the multiple computing devices, data aggregation optimizer 142 may determine that aggregation of the data of the same type can occur at the particular edge device rather than a cloud server (e.g. cloud server 140). As another example, if the identified enhanced topology reveals that a processing hierarchy exists between data of different types and that aggregation, according to the processing hierarchy, of the different data types can occur among one or more edge devices, data aggregation optimizer 142 may determine that the aggregation should occur among the one or more edge devices. If it is determined that aggregation of the received data can occur at an edge device, data aggregation optimizer 142 proceeds to step S240. If it is determined that aggregation of the received data cannot occur at an edge device, data aggregation optimizer 142 proceeds to step S270. In an example embodiment, data aggregation optimizer 142 may determine that the data received in step S210 can be aggregated by an edge device (e.g. edge device 130) based on the enhanced topology identified in step S220. In another embodiment, data aggregation optimizer 142 may determine that the data received in step S210 can be aggregated by one or more edge devices (e.g. edge devices 130 and 131) based on an SLA defined by either a user or by requirements of DER system 100. For example, an SLA may specify that only forty percent of existing data volume should be aggregated at the cloud data center (e.g. cloud server 140) and that sixty percent or more of data from computing devices (e.g. computing devices 120 and 121) must be aggregated by edge devices (e.g. edge devices 130 and 131). In such an embodiment, data aggregation optimizer 142 may determine if offloading of data aggregation from cloud server 140 is necessary and if so, select an appropriate subset of computing devices from which data will be aggregated by one or more edge devices. Data aggregation optimizer 142 may identify an enhanced topology for the data based on the data and metadata received from the selected subset of computing devices.

Referring to step S240, in response to determining that aggregation of the received data can occur at an edge device, data aggregation optimizer 142 may use the identified enhanced topology to determine an edge device aggregation location and network routing decisions for the received data and for subsequent affiliated data. The determination on which edge device(s) to select as the aggregation location may be based on knowledge provided by the identified enhanced topology, which may include details of what each edge computing device is capable of processing. In an example embodiment, data aggregation optimizer 142 may use the enhanced topology identified in step S220 to select edge device 130 as the aggregation location for the data received in step S210 and for all subsequent data affiliated with the received data and originating from client device 120 and client device 121. Furthermore, in an example embodiment, data aggregation optimizer 142 may also determine the network routing decision(s) to facilitate the flow of subsequent affiliated data, originating from computing device 120 and computing device 121, to edge device 130.

Referring to step S250, data aggregation optimizer 142 may propagate the aggregation location(s) and network routing decision(s) determined in step S240 to edge devices and computing devices within DER system 100. Data aggregation optimizer 142 may utilize known technologies such as virtual networks/software defined networks and TCP/IP based routing to implement the determined network routing decision(s). Data aggregation optimizer 142 may also store the identified enhanced topology within a database (e.g. topology database 144). In an example embodiment, data aggregation optimizer 142 may propagate the aggregation location and network routing decisions determined in step S240 to edge device 130, edge device 131, computing device 120, and computing device 121. Additionally, in an example embodiment, data aggregation optimizer 142 may utilize a software defined network (SDN) to implement the determined network routing decision(s). As a result, subsequent affiliated data originating from computing device 120 and computing device 121 will flow into edge device 130 for aggregation. Furthermore, in an example embodiment, data aggregation optimizer 142 may store the enhanced topology, identified in step S220, within topology database 144.

Referring to step S260, data aggregation optimizer 142 may send the data received in step S210 to the edge device aggregation location determined in step S240. Once the determined edge device aggregation location has received and aggregated/processed the data, the determined edge device aggregation location may transmit the data to a computing device (e.g. computing device 120, computing device 121). The determined edge device aggregation location may also transmit the aggregated/processed data to a cloud data center (e.g. cloud server 140). In an embodiment where aggregated/processed data is transmitted to cloud server 140, DER system 100 benefits from reduced utilization of network bandwidth and resources as aggregated/processed data is typically smaller in amount as compared to un-aggregated/unprocessed data. In an example embodiment, data aggregation optimizer 142 may send the unprocessed/un-aggregated data received in step S210 to edge device 130 for aggregation.

In an example embodiment, data aggregation optimizer 142 and topology database 144 may be located in a cloud data center (e.g. cloud server 140) and steps S210 to S260 may be performed by the cloud data center (e.g. cloud sever 140). In an example embodiment, cloud server 140 may first handle a network that does not implement data aggregation optimizer 142, meaning that all the data will be sent to cloud server 140 based on a natural network topology stored in topology database 144. However, cloud server 140 may then discover relationships between data types and the network routes they take (i.e. an enhanced topology for the data). Once cloud server 140 identifies an enhanced topology for the data, it can start to implement data aggregation optimizer 142 and make routing decisions. In another embodiment, data aggregation optimizer 142 and topology database 144 may be located on an edge device (e.g. edge device 130) and steps S210 to S260 may be performed by the edge device (e.g. edge device 130). The closer the edge device is located to the cloud data center (i.e. logical network layers closer to the cloud data center), the more knowledge the particular edge device possesses about incoming data. As a result, the edge device can potentially make routing decisions based on local knowledge and propagate routing decisions to more edge devices (i.e. logical network layers closer to the data sources).

Referring to step S270, in response to determining that aggregation of the received data cannot occur at an earlier edge device, data aggregation optimizer 142 may aggregate/process the data received in step S210. In an embodiment, data aggregation optimizer 142 may determine that aggregation of the received data cannot occur at an earlier edge device as a result of having received pre-processed/aggregated data according to a previously identified enhanced topology. For example, cloud server 140 may receive, from edge device 130, an average temperature reading based on the temperature readings originating from computing device 120 and computing device 121 and aggregated by edge device 130. In another embodiment, data aggregation optimizer 142 may determine that aggregation of the received data cannot occur at an earlier edge device as a result of having received data according to a natural topology for the network.

Figure 3:
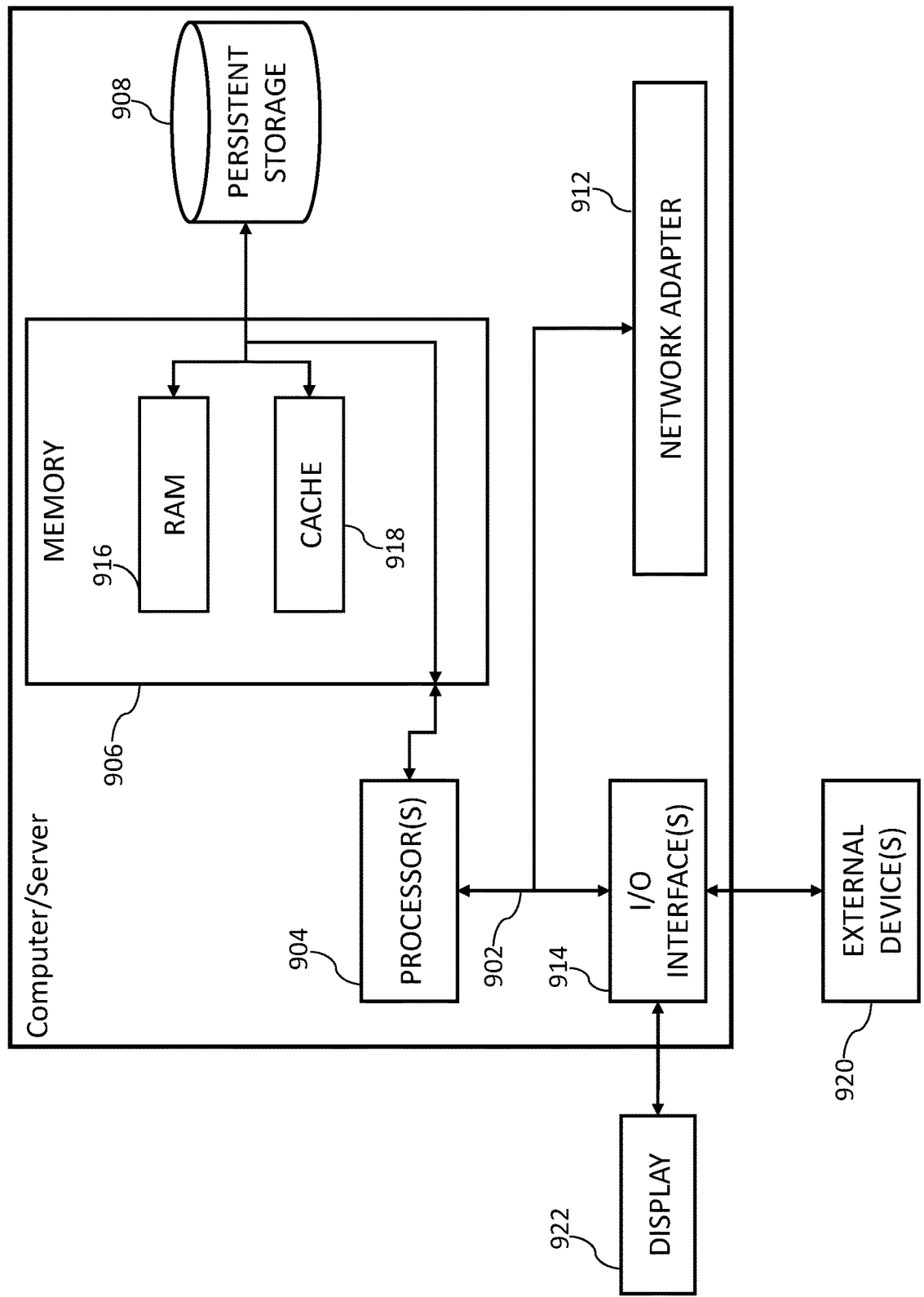
FIG. 3 is a block diagram depicting the hardware components of the dispersed storage system of FIG. 1, in accordance with an embodiment of the invention.

FIG. 3 depicts a block diagram of components of computing device 120, computing device 121, edge device 130, edge device 131, and cloud server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 120, computing device 121, edge device 130, edge device 131, and cloud server 140 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs software module 122, in computing device 120; software module 123, in computing device 121; data processing module 132 in edge device 130; data processing module 133 in edge device 131; and data aggregation optimizer 142 in cloud server 140 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs software module 122, in computing device 120; software module 123, in computing device 121; data processing module 132 in edge device 130; data processing module 133 in edge device 131; and data aggregation optimizer 142 in cloud server 140 may be downloaded to persistent storage 908 through network adapter 912.

I/O interface(s) 914 allows for input and output of data with other devices that may be connected to computing device 120, computing device 121, edge device 130, edge device 131, and cloud server 140. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs software module 122, in computing device 120; software module 123, in computing device 121; data processing module 132 in edge device 130; data processing module 133 in edge device 131; and data aggregation optimizer 142 in cloud server 140, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited, and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
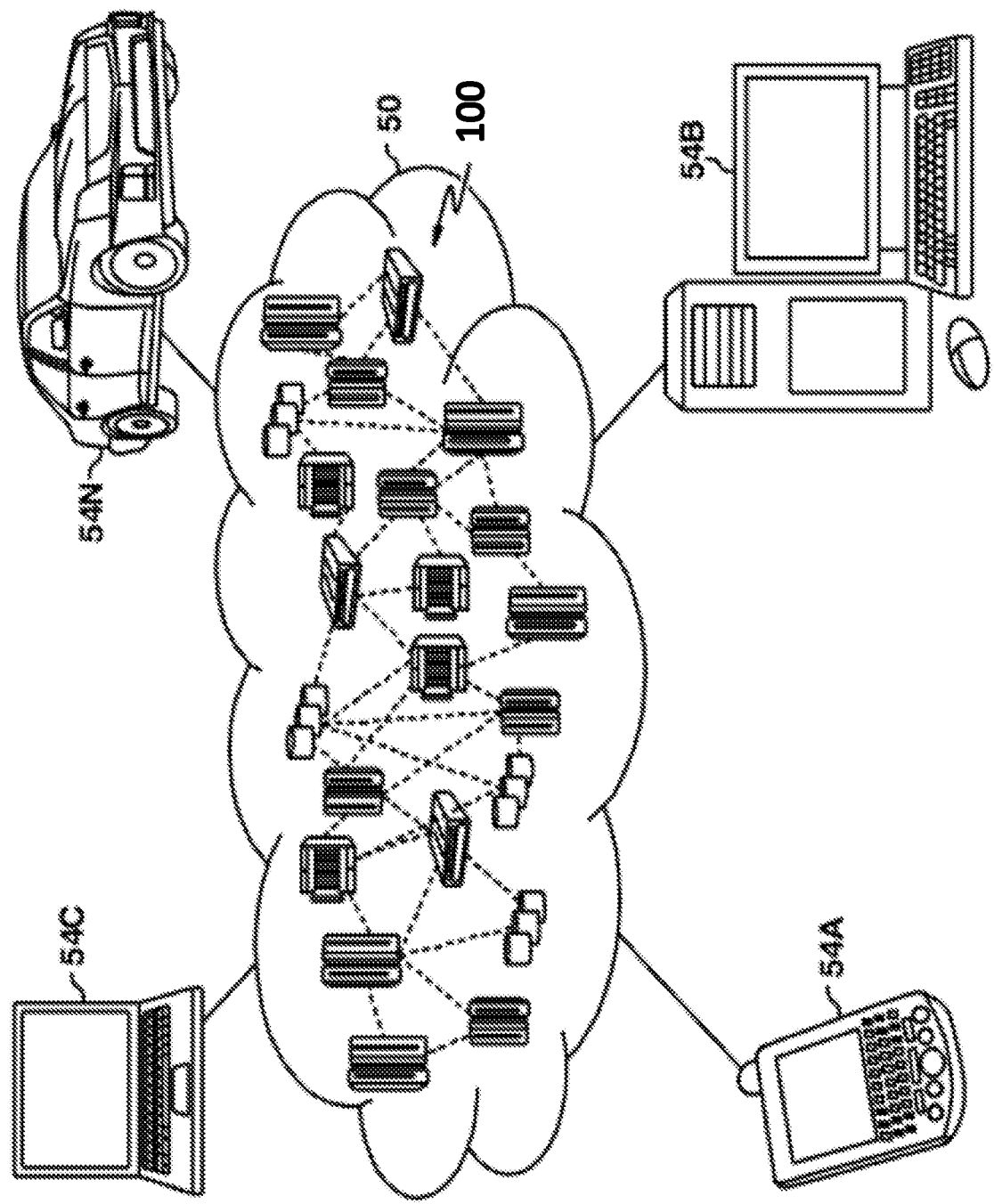
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
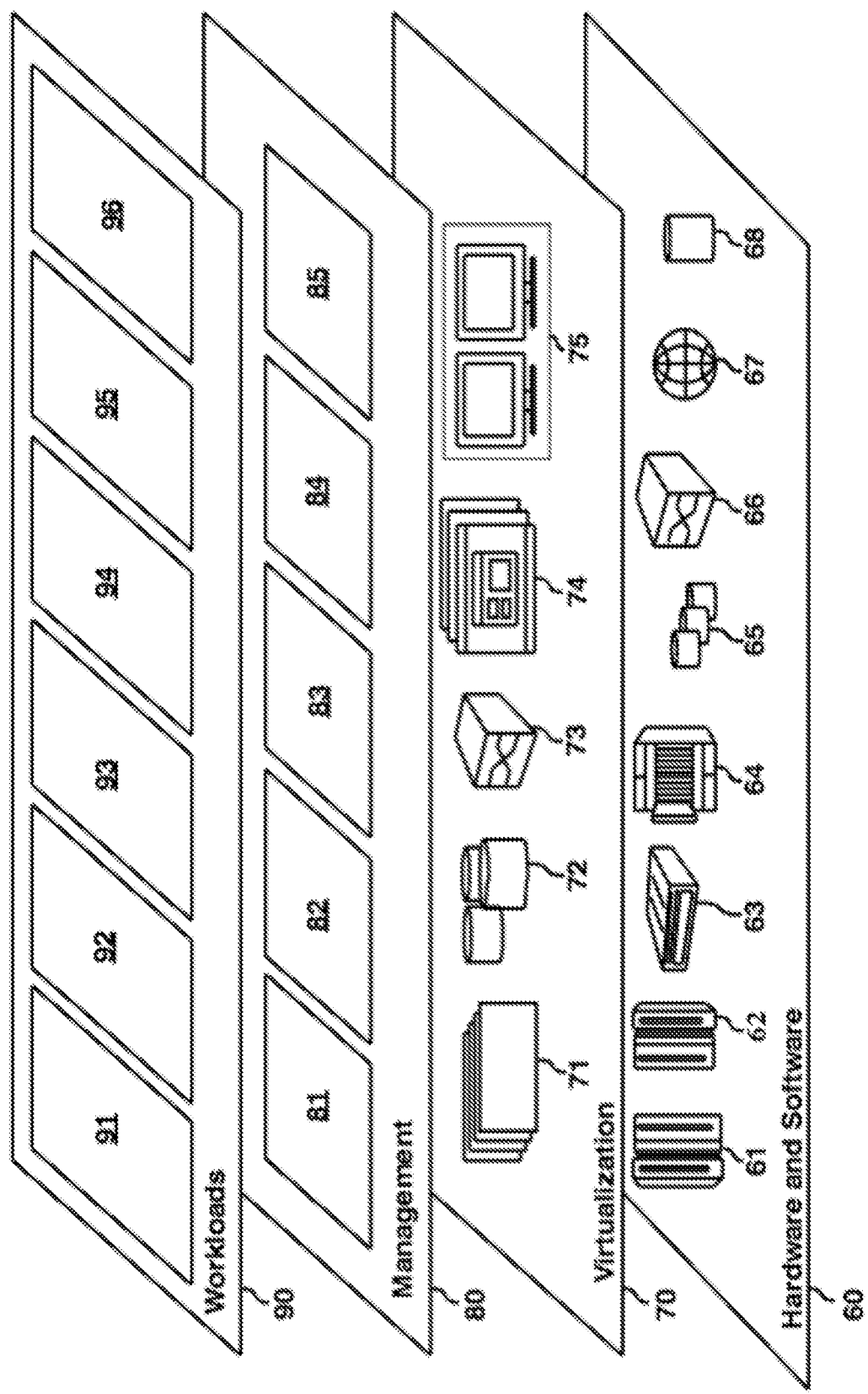
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamic edge routing system 96. Dynamic edge routing system 96 may relate to determining data aggregation location(s), based on data relationship and interdependency, among edge computing devices within a cloud computing environment.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A method for redirecting data within a cloud computing network, the method comprising:
    receiving data, according to a natural topology of the cloud computing network, at a cloud server of the cloud computing network, wherein the received data originates from one or more computing devices of the cloud computing network and flows through one or more edge devices of the cloud computing network, and wherein the received data comprises associated metadata which describes one or more attributes of the received data comprising a data type, a relationship to other data from the one or more computing devices, a data affinity, a processing hierarchy, and an interdependency to other data from the one or more computing devices, and wherein the natural topology results from an initial setup of the cloud computing network;
    identifying an enhanced topology for the received data, wherein the enhanced topology is based on analysis of the associated metadata which identifies any existing relationships and interdependencies within the received data;
    based on the identified enhanced topology, determining whether the received data can be aggregated at an edge device of the one or more edge devices, wherein the edge device is in closer geographical proximity to the one or more computing devices than the cloud server;
    in response to determining that the received data cannot be aggregated at the edge device, aggregating the received data at the cloud server;
    in response to determining that the received data can be aggregated at the edge device, determining an aggregation location for subsequent data, wherein the aggregation location for the subsequent data is the edge device, and wherein the subsequent data originates from the one or more computing devices, and wherein the subsequent data is affiliated with the received data based on the existing relationships and interdependencies, if any, identified within the received data;
    in response to determining the aggregation location for subsequent data, determining a network route for utilization by the subsequent data, wherein the determined network route begins at the one or more computing devices and terminates at the aggregation location;
    propagating the determined aggregation location and the determined network route throughout the cloud computing network; and
    transmitting the received data to the edge device for aggregation.

2. The method of claim 1, further comprising:
    determining one or more alternate aggregation locations, among the one or more edge devices, for the one or more computing devices according to a service level agreement.

3. The method of claim 2, further comprising:
    determining a percentage of the received data for aggregation to be offloaded to the one or more alternate aggregation locations based on the service level agreement;
    selecting a subset of the one or more computing devices, wherein the determined percentage of the received data for aggregation to be offloaded comprises data received from the subset of the one or more computing devices, and wherein the data received from the subset of the one or more computing devices comprises associated metadata;
    identifying the topology for the data received from the subset of the one or more computing devices based on the associated metadata;
    based on the identified topology, selecting the one or more alternate aggregation locations from among the one or more edge devices;
    determining a network route, wherein the determined network route begins at the one or more computing devices and terminates at the one or more alternate aggregation locations; and
    implementing the determined network route.

4. The method of claim 1, wherein identifying the enhanced topology for the received data based on the associated metadata comprises analysis of the associated metadata to identify any of an existing attribute, relationship, affinity, hierarchy, and interdependency within the received metadata.

5. The method of claim 1, further comprising:
    utilizing a software defined network to implement the determined network route for the subsequent data.

6. The method of claim 1, further comprising:
    utilizing transmission control protocol/Internet protocol based routing to implement the determined network route for the subsequent data.

7. A computer program product for redirecting data within a cloud computing network, the computer program product comprising:
    one or more computer-readable tangible storage devices and program instructions stored on at least one of the one or more computer-readable tangible storage devices, the program instructions executable by a computer, the program instructions comprising:
    program instructions to receive data, according to a natural topology of the cloud computing network, at a cloud server of the cloud computing network, wherein the received data originates from one or more computing devices of the cloud computing network and flows through one or more edge devices of the cloud computing network, and wherein the received data comprises associated metadata which describes one or more attributes of the received data comprising a data type, a relationship to other data from the one or more computing devices, a data affinity, a processing hierarchy, and an interdependency to other data from the one or more computing devices, and wherein the natural topology results from an initial setup of the cloud computing network;
    program instructions to identify an enhanced topology for the received data, wherein the enhanced topology is based on analysis of the associated metadata which identifies any existing relationships and interdependencies within the received data;

based on the identified enhanced topology, program instructions to determine whether the received data can be aggregated at an edge device of the one or more edge devices, wherein the edge device is in closer geographical proximity to the one or more computing devices than the cloud server;

in response to determining that the received data cannot be aggregated at the edge device, program instructions to aggregate the received data at the cloud server;

in response to determining that the received data can be aggregated at the edge device, program instructions to determine an aggregation location for subsequent data, wherein the aggregation location for the subsequent data is the edge device, and wherein the subsequent data originates from the one or more computing devices, and wherein the subsequent data is affiliated with the received data based on the existing relationships and interdependencies, if any, identified within the received data;

in response to determining the aggregation location for subsequent data, program instructions to determine a network route for utilization by the subsequent data, wherein the determined network route begins at the one or more computing devices and terminates at the aggregation location;

program instructions to propagate the determined aggregation location and the determined network route throughout the cloud computing network; and program instructions to transmit the received data to the edge device for aggregation.

8. The computer program product of claim 7, further comprising:

program instructions to determine one or more alternate aggregation locations, among the one or more edge devices, for the one or more computing devices according to a service level agreement.

9. The computer program product of claim 8, further comprising:

program instructions to determine a percentage of the received data for aggregation to be offloaded to the one or more alternate aggregation locations based on the service level agreement;

program instructions to select a subset of the one or more computing devices, wherein the determined percentage of the received data for aggregation to be offloaded comprises data received from the subset of the one or more computing devices, and wherein the data received from the subset of the one or more computing devices comprises associated metadata;

program instructions to identify the topology for the data received from the subset of the one or more computing devices based on the associated metadata;

based on the identified topology, program instructions to select the one or more alternate aggregation locations from among the one or more edge devices;

program instructions to determine a network route, wherein the determined network route begins at the one or more computing devices and terminates at the one or more alternate aggregation locations; and program instructions to implement the determined network route.

10. The computer program product of claim 7, wherein program instructions to identify the enhanced topology for the received data based on the associated metadata comprises analysis of the associated metadata to identify any of an existing attribute, relationship, affinity, hierarchy, and interdependency within the received metadata.

11. The computer program product of claim 7, further comprising:

program instructions to utilize a software defined network to implement the determined network route for the subsequent data.

12. The computer program product of claim 7, further comprising:

program instructions to utilize transmission control protocol/Internet protocol based routing to implement the determined network route for the subsequent data.

13. A computer system for redirecting data within a cloud computing network, the computer system comprising:

one or more processors, one or more computer-readable memories, one or more computer-readable tangible storage devices, and program instructions stored on at least one of the one or more computer-readable tangible storage devices for execution by at least one of the one or more processors via at least one of the one or more memories, the program instructions comprising:

program instructions to receive data, according to a natural topology of the cloud computing network, at a cloud server of the cloud computing network, wherein the received data originates from one or more computing devices of the cloud computing network and flows through one or more edge devices of the cloud computing network, and wherein the received data comprises associated metadata which describes one or more attributes of the received data comprising a data type, a relationship to other data from the one or more computing devices, a data affinity, a processing hierarchy, and an interdependency to other data from the one or more computing devices, and wherein the natural topology results from an initial setup of the cloud computing network;

program instructions to identify an enhanced topology for the received data, wherein the enhanced topology is based on analysis of the associated metadata which identifies any existing relationships and interdependencies within the received data;

based on the identified enhanced topology, program instructions to determine whether the received data can be aggregated at an edge device of the one or more edge devices, wherein the edge device is in closer geographical proximity to the one or more computing devices than the cloud server;

in response to determining that the received data cannot be aggregated at the edge device, program instructions to aggregate the received data at the cloud server;

in response to determining that the received data can be aggregated at the edge device, program instructions to determine an aggregation location for subsequent data, wherein the aggregation location for the subsequent data is the edge device, and wherein the subsequent data originates from the one or more computing devices, and wherein the subsequent data is affiliated with the received data based on the existing relationships and interdependencies, if any, identified within the received data;

in response to determining the aggregation location for subsequent data, program instructions to determine a network route for utilization by the subsequent data, wherein the determined network route begins at the one or more computing devices and terminates at the aggregation location;

program instructions to propagate the determined aggregation location and the determined network route throughout the cloud computing network; and program instructions to transmit the received data to the edge device for aggregation.

14. The computer system of claim 13, further comprising:
program instructions to determine one or more alternate aggregation locations, among the one or more edge devices, for the one or more computing devices according to a service level agreement.

15. The computer system of claim 14, further comprising:
program instructions to determine a percentage of the received data for aggregation to be offloaded to the one or more alternate aggregation locations based on the service level agreement;

program instructions to select a subset of the one or more computing devices, wherein the determined percentage of the received data for aggregation to be offloaded comprises data received from the subset of the one or more computing devices, and wherein the data received from the subset of the one or more computing devices comprises associated metadata;

program instructions to identify the topology for the data received from the subset of the one or more computing devices based on the associated metadata;

based on the identified topology, program instructions to select the one or more alternate aggregation locations from among the one or more edge devices;

program instructions to determine a network route, wherein the determined network route begins at the one or more computing devices and terminates at the one or more alternate aggregation locations; and program instructions to implement the determined network route.

16. The computer system of claim 13, wherein program instructions to identify the enhanced topology for the received data based on the associated metadata comprises analysis of the associated metadata to identify any of an existing attribute, relationship, affinity, hierarchy, and interdependency within the received metadata.

17. The computer system of claim 13, further comprising:
program instructions to utilize a software defined network to implement the determined network route for the subsequent data.

* * * * *